Patented July 11, 1950

2,514,550

UNITED STATES PATENT OFFICE 2,514,550

TREATMENT OF SYNTHETIC FIBERS WITH FORMALDEHYDE

Samuel B. McFarlane and Gilbert E. Moos, Summit, N. J., assignors to Celanese Corporation of America, a corporation of Delaware No Drawing. Application February 14, 1948, Serial No. 8,304

6 Claims. (Cl. 8—115.5)

This invention relates to the treatment of shaped materials such as filaments and relates more particularly to the treatment of filaments having a basis of a high molecular weight linear polyurethane or of a high molecular weight linear polymeric carbamide whereby the properties of said filaments may be improved.

It has been proposed to employ filaments having a basis of a high molecular weight linear polymeric polyurethane or of a linear polymeric carbamide for textile purposes. The linear polymeric polyurethanes may be obtained by reacting a bifunctional diisocyanate with a glycol in an inert solvent, for example, at a suitable polymerizing temperature while the linear polymeric carbamides may be obtained by reacting a bifunctional diisocyanate with a diamine, also at a suitable polymerizing temperature. The linear polymers obtained as the product of this polymerization reaction have been found to have excellent filament-forming properties. Filaments may be formed from these polymers by suitable melt-spinning operations wherein the polymer is heated until melted and the molten polymer then extruded through one or more fine orifices whereby the polymer is shaped into smooth, bright filaments of the desired diameter. The resulting filaments possess substantial elongation and may be cold-drawn, if desired, to produce filaments of a highly oriented structure having a relatively high tenacity.

The use of these filaments for textile purposes is not entirely practical, however, since the melting point of say, the polymeric polyurethanes ranges from about 130 to 200° C. This temperature range is much too low to permit fabrics of said materials to be ironed satisfactorily. In addition, the filaments not only have a glossy appearance but a relatively low degree of moisture absorption or moisture regain as well. As a consequence, they possess a somewhat cold feel and a harsh and wiry hand.

It is, therefore, an important object of this invention to provide a process for the treatment of filaments having a basis of a high molecular weight polyurethane or of a high molecular weight polymeric carbamide whereby the melting point of said filaments may be increased and the textile properties thereof substantially improved.

Another object of this invention is the provision of a process for the treatment of filaments of a high molecular weight polymeric polyurethane or polymeric carbamide whereby said filaments are so modified that the moisture regain or normal moisture content is increased and a softer hand and improved appearance and dyeing properties imparted to said filaments.

A further object of this invention is the treatment of filaments of a high molecular weight polymeric polyurethane or polymeric carbamide whereby filaments possessing a modified lustre may be obtained.

Yet another object of this invention is the production of filaments having a basis of a high molecular weight polymeric polyurethane or polymeric carbamide possessing a high degree of elasticity.

Other objects of this invention will appear from the following detailed description.

We have now found that the textile properties of filaments having a basis of a high molecular weight polyurethane or polymeric carbamide may be considerably improved and the undesirable characteristics thereof substantially eliminated if said filaments are reacted with formaldehyde, or a formaldehyde-yielding substance under suitable reaction conditions. The reaction is preferably effected by immersing the polymeric polyurethane or polymeric carbamide filaments in a suitable solution of aqueous formaldehyde, or a formaldehyde-yielding substance such as paraformaldehyde, hexamethylene tetramine, trioxane, methylal, dimethylol urea or aldehyde-ammonia containing a catalyst yielding a solution which is either acidic and has a pH of less than 3.5 or is alkaline with a pH of at least 10. The filaments are subjected to the action of the treating medium at a temperature of about 50 to 150° C. The treated filaments are then washed thoroughly with distilled water and dried. Drying may be carried out conveniently by heating for about one hour at a temperature of say, 105 to 110° C. The effect of the foregoing treatment on the filaments is quite marked and the modified filaments obtained are found to exhibit a substantially increased melting point, increased elasticity if previously cold-drawn, a desirable lustre and an increased normal moisture content or moisture regain. The increase in moisture regain gives the treated filaments a very desirable hand and a soft, silky appearance.

In forming the medium employed for the treatment of said polymeric polyurethane or polymeric carbamide filamentary materials, where an acidic medium having a pH of less than 3.5 is employed, the necessary acidity may be achieved by the addition of any suitable acid with an ionization constant of the order of $10^{-6}$, such as hydrochloric acid, oxalic acid, acetic acid, phosphoric acid or sulfuric acid to the solution. An alkaline treating medium having a pH of at least 10 may be conveniently formed by the addition of a suitable amount of a base with an ionization constant of the order of $10^{-5}$ or greater, such as sodium hydroxide. The use of ammonium chloride in the acid treating medium as a buffer has also been found to be quite advantageous. In some instances, both an acid and a base, such as oxalic acid and sodium hydroxide may be present in the treating medium but the use of too large a quantity of sodium hydroxide so as to cause the oxalic acid to be neutralized excessively is undesirable as it brings the pH outside of the desired limits.

Thus, where an acidic treating medium is employed, the same preferably comprises from 10 to 90% by weight of aqueous 40% (by volume) formaldehyde, 10 to 80% by weight of methyl alcohol, 0.1 to 10% by weight of oxalic acid and 0.2 to 10% by weight of ammonium chloride so that the pH is less than 1.5. When an alkaline medium is employed, it preferably comprises 10 to 90% by weight of aqueous 40% formaldehyde, 10 to 80% by weight of methyl alcohol, and 0.1 to 10% by weight of sodium hydroxide with a suitable sodium phosphate, such as trisodium-phosphate, as a buffer material, so that the pH will be at least 10. Formaldehyde-yielding substances, such as, for example, paraformaldehyde may be employed in place of aqueous formaldehyde in these treating baths, the paraformaldehyde employed being equivalent in amount, of course, to the amount of formaldehyde present in the 40% aqueous solution employed above.

The polymeric polyurethane or polymeric carbamide materials, from which the filaments treated in accordance with out novel process are formed, are obtained by reacting an organic diisocyanate of the formula OCN—R—NCO with a diol such as a polymethylene glycol, or an organic diamine of the formula $H_2N$—R—$NH_2$, where R in both formulas is a divalent organic radical free of functional groups, under polymerizing conditions.

Among the diisocyanates which may be employed are, for example, polymethylene diisocyanates, such as trimethylene diisocyanate, tetramethylene diisocyanate, pentamethylene diisocyanate, hexamethylene diisocyanate, octamethylene diisocyanate and decamethylene diisocyanate, alkylene diisocyanates, cycloalkylene diisocyanates, such as cyclopentylene-1,3-diisocyanate, cyclohexylene-1,3-diisocyanate, and cyclohexylene-1,4-diisocyanate, aromatic diisocyanates, such as p-phenylene diisocyanate, o-phenylene diisocyanate, xylylene-1,4-diisocyanate, diphenylene-4,4'-diisocyanate, naphthylene-1,4-diisocyanate, diphenylmethane-4,4'-diisocyanate and dixylylenemethane-4,4'-diisocyanate.

The diols or diamines with which the diisocyanates may be reacted to form the polymeric polyurethanes or polymeric carbamides may be alkylene, polymethylene, cycloalkylene, aromatic or aromatic-aliphatic compounds. Thus, suitable diols are, for example, ethylene glycol, diethylene glycol, triethylene glycol, tetraethylene glycol, trimethylene glycol, 1,4-butanediol, pentamethylene glycol, hexamethylene glycol, heptamethylene glycol, octamethylene glycol, nonamethylene glycol, decanediol, resorcinol, 4,4'-dihydroxy-diphenyl, ethylene diamine, tetramethylene diamine or p-phenylene diamine. In general, the diols or diamines formed by replacing the isocyanate groups of the diisocyanate compounds mentioned above are suitable for the polymerization reaction whereby the polymeric polyurethanes and polymeric carbamides are formed.

The polymerization reaction may be effected with or without the use of solvents or diluents such as chlorbenzene, nitrobenzene, dichlorbenzene or pyridine, either in an open reaction vessel or in a sealed vessel. Usually, equimolecular proportions of the diisocyanate and diol or diamine are reacted at a temperature of 100 to 225° C. and reaction is continued until the polymer formed exhibits filament-forming properties. When employing a solvent or diluent during the polymerization reaction, the reaction is usually effected at the boiling point of the solvent until the polymer formed precipitates. The latter is then separated, washed to remove the solvent and dried. One or more diisocyanates may be reacted with one or more diols or diamines or a mixture of a diol and diamine to yield polymers of varying properties. Other well known methods of forming the polymers may be used. The polymers are shaped to form filaments by suitable melt-spinning operations, as described.

The polymeric polyurethane and polymeric polycarbamide filamentary materials treated in accordance with our novel process are preferably those which have not been completely cold-drawn to a highly oriented structure and which, accordingly, retain at least some capacity to undergo further cold-drawing before the breaking point is reached. We have found that the amount of elastic elongation obtained can be varied at will by controlling the extent of cold-drawing which is preferably carried out with temperatures higher than room temperature in order to obtain better uniformity in the cross section diameter of the filament. By treating such filaments with formaldehyde in accordance with our process, the residual capacity of said filaments to undergo further cold-drawing is modified and so changed that it appears as elasticity in the treated filaments. The resulting elasticity or ability to be stretched and to recover or return to its original length when the stress placed thereon is released may be varied within rather wide limits. By a suitable combination of cold-drawing, to a greater or lesser degree, followed by our novel treatment, modified polyurethane or polycarbamide filaments having any desired degree of elasticity of from 10 to, say, 300% may be obtained. The term "drawn" as employed hereinafter and in the appended claims is to be understood as referring to both partly drawn and completely drawn filaments.

In order further to illustrate our invention, but without being limited thereto, the following examples are given:

*Example I*

A skein of 21 denier monofilament yarn having a basic of high molecular weight polymeric polyurethane formed by reacting 1,4-butanediol with tetramethylene diisocyanate and having a melting point of 203° C. is immersed in a medium having a pH of 0.70 and consisting of

| | Parts by weight |
|---|---|
| Formaldehyde (40% by volume, aqueous) | 4.5 |
| Hydrochloric acid | 0.12 |
| Methyl alcohol | 3.2 |

The skein of filaments is heated in this medium for one hour at 60° C. The treated skein is washed thoroughly with distilled water, then soaked for about 15 hours in distilled water and dried for one hour at 105–110° C. The treated monofilamentary material has a melting point of more than 300° C. It has an increased moisture regain over the original material and the hand of the filaments is changed from one which is hard and wiry to one that is soft and silky.

Example II

A skein of undrawn monofilament yarn of the polymeric polyurethane as described in Example I is immersed for one hour at 60° C. in an acid medium consisting of

| | Parts by weight |
|---|---|
| Formaldehyde (40% by volume, aqueous) | 13.2 |
| Oxalic acid | 0.1 |
| Methyl alcohol | 3.2 |

The treated skein is washed thoroughly with distilled water, soaked in distilled water for about 15 hours and dried for one hour at 105–110° C. The treated monofilamentary material is found to have increased in weight by 2.3% and has a melting point of 300° compared with 203° C. for the untreated material.

Example III

A skein of undrawn monofilament yarn of 15 denier as described in Example I is immersed in the medium consisting of

| | Parts by weight |
|---|---|
| Paraformaldehyde | 10 |
| Oxalic acid | 2.12 |
| Methyl alcohol | 32.4 |

The skein of filaments is heated in this medium for one hour at 60° C. The treated skein is washed thoroughly with distilled water, then soaked in distilled water for about 15 hours and dried for one hour at 105–110° C. The treated monofilamentary material is found to have increased in weight by 1.3% and to have a melting point of over 300° C.

Example IV

A skein of 16 denier undrawn monofilament yarn of the polymeric polyurethane described in Example I is immersed in a medium having a pH of 1.0 and consisting of

| | Parts by weight |
|---|---|
| Formaldehyde (40% by volume, aqueous) | 4.5 |
| Oxalic acid | 0.1 |
| Ammonium chloride | 0.5 |
| Methyl alcohol | 3.2 |

The skein of filaments is heated in this medium for one hour at 60° C., washed in distilled water and dried as in the preceding examples. The treated monofilamentary material is found to have increased in weight by 4.8%, to have an elastic elongation of 296% and to have a melting point above 300° C.

Example V

A skein of 17 denier monofilaments of the polymeric polyurethane described in Example I is immersed in a medium having a pH of 1.19 and consisting of

| | Parts by weight |
|---|---|
| Formaldehyde (40% by volume, aqueous) | 4.5 |
| Oxalic acid | 0.2 |
| Sodium hydroxide | 0.05 |
| Ammonium chloride | 0.5 |
| Methyl alcohol | 3.2 |

The treatment is the same as the preceding examples. The filament gain 4.3% by weight and the melting point is over 300° C. The elastic elongation is 250% and the lustre is decreased, while the moisture regain is increased.

Example VI

A skein of 17 denier monofilaments of the polymeric polyurethane described in Example I is immersed for one hour at 60° C. in a medium having a pH of 11.08 and consisting of

| | Parts by weight |
|---|---|
| Formaldehyde (40% by volume, aqueous) | 4.5 |
| Sodium hydroxide | 0.01 |
| Methyl alcohol | 3.2 |

The heated skein is washed thoroughly and dried. The treated filaments have a melting point of 270° C., and have gained 0.9% in weight. The moisture regain is increased resulting in very desirable soft hand to the filaments. The elasticity or elongation of the filaments is 237%.

Example VII

A skein of 17 denier monofilaments of the polymeric polyurethane described in Example I is immersed for one hour at 60° C. in a medium having a pH of 1.38 and consisting of

| | Parts by weight |
|---|---|
| Formaldehyde (40% by volume, aqueous) | 4.5 |
| Oxalic acid | 0.2 |
| Methyl alcohol | 3.2 |
| Ammonium chloride | 0.2 |
| Sodium hydroxide | 0.05 |

The washed and treated filaments have a melting point of 300° C. The elongation or elasticity is about 400% and the skein has gained 5% in weight.

Example VIII

A skein of monofilaments of polymeric polyurethane described in Example I is immersed for one hour at 60° C., in a medium having a pH of 10.1 and consisting of

| | Parts by weight |
|---|---|
| Formaldehyde (40% by volume, aqueous) | 4.5 |
| Methyl alcohol | 3.2 |
| Sodium hydroxide | 0.02 |

The washed and dried filaments have a melting point of 285° C.

Example IX

A skein of 3 denier drawn monofilaments of the polymeric polyurethane described in Example I is immersed for one hour at 60° C. in a medium having a pH of 1.2 consisting of

| | Parts by weight |
|---|---|
| Formaldehyde (40% by volume, aqueous) | 22.4 |
| Oxalic acid | 0.5 |
| Methyl alcohol | 15.8 |
| Ammonium chloride | 2.5 |
| Sodium hydroxide | 0.25 |

The washed and dried filaments have a melting point of over 300° C. The moisture regain is increased from an initial value of 1.35% to a value of about 1.56% changing the hand of the filaments from one which is harsh and wiry to one which is soft and silky. The elongation of the treated filaments is 15.8%, and it shows a gain in weight of 0.5%.

Example X

These filaments are immersed in a medium having a pH of 1.1 and consisting of

| | Parts by weight |
|---|---|
| Formaldehyde (40% by volume, aqueous) | 4.5 |
| Methyl alcohol | 3.2 |
| Ammonium chloride | 0.2 |

The washed and dried filaments have a melting point of 250° C. They increased in weight by 5.3%.

Example XI

A skein of 6.5 denier drawn monofilaments of the polymeric polyurethane described in Example I is immersed for one hour at 60° C., in a medium having a pH of 1.3 and consisting of

| | Parts by weight |
|---|---|
| Formaldehyde (40% by volume, aqueous) | 22.4 |
| Oxalic acid | 1.0 |
| Methyl alcohol | 15.8 |
| Sodium hydroxide | 0.5 |
| Ammonium chloride | 2.5 |

The treated skein is washed thoroughly, soaked for about 15 hours in distilled water and dried at 105–110° C. for one hour. The treated filaments have a melting point of over 300° C. The moisture regain is increased from an initial value of 1.35% to about 2% changing the hand of the filaments from one which is harsh and wiry to one which is soft and silky. The elongation of the treated filament is 35% and it has gained 0.2% in weight.

Example XII

A skein of undrawn monofilament yarn of the polymeric polyurethane described in Example I is immersed for 15 minutes at 60° C., in a medium of pH 0.60 consisting of

| | Parts by weight |
|---|---|
| Formaldehyde (40% by volume, aqueous) | 4.5 |
| Phosphoric acid (85%) | 2.57 |
| Methyl alcohol | 3.2 |

The washed and dried monofilaments are found to have increased in weight by 3.5%, and to have a melting point above 300° C.

Example XIII

A quantity of 16 denier drawn yarn of the polymeric polyurethane described in Example I is soaked ½ hour in a mixture of

| | Parts by weight |
|---|---|
| Formaldehyde (40% by volume, aqueous) | 1.12 |
| Water | 1.0 |
| Methyl alcohol | 0.79 |
| Oxalic acid | 0.1 |
| Ammonium chloride | 0.1 |

The washed and dried filaments have a tenacity of 5.22, an elongation of 27%, and a melting point above 275° C. The moisture regain was raised from 2.5% to 5.4% by the formaldehyde treatment. To the touch the yarn appears white, lustrous, silky and soft and it is no longer wiry and stiff as before the treatment.

While our invention has been more particularly described in connection with the treatment of filaments, thin films as well as foils having a basis of a polymeric polyurethane or polymeric carbamide of improved properties may also be obtained if the same are subjected to said novel formaldehyde treatment.

It is to be understood that the foregoing detailed description is given merely by way of illustration and that many variations may be made therein without departing from the spirit of our invention.

Having described our invention, what we desire to secure by Letters Patent is:

1. Process for the treatment of filaments having a basis of a polymeric material selected from the group consisting of polyurethanes and polycarbamides, which comprises heating said filaments in a solution of a substance, selected from the group consisting of formaldehyde-yielding substances, containing sufficient sodium hydroxide to maintain the pH of said solution at at least 10.

2. Process for the treatment of filaments having a basis of a polymeric material selected from the group consisting of polyurethanes and polycarbamides, which comprises heating said filaments in a solution of a substance, selected from the group consisting of formaldehyde-yielding substances, containing a sodium phosphate and sufficient sodium hydroxide to maintain the pH of said solution at at least 10.

3. Process for the treatment of filaments having a basis of a polymeric polyurethane, which comprises heating said filaments in a methyl alcohol solution of formaldehyde containing sufficient sodium hydroxide to maintain the pH of said solution at at least 10.

4. Process for the treatment of filaments having a basis of a polymeric polyurethane, which comprises heating said filaments in a methyl alcohol solution of formaldehyde containing a sodium phosphate and sufficient sodium hydroxide to maintain the pH of said solution at at least 10.

5. Process for the treatment of filaments having a basis of a polymeric polyurethane formed by reacting 1,4-butanediol with tetramethylene diisocyanate, which comprises heating said filaments in a methyl alcohol solution of formaldehyde containing sufficient sodium hydroxide to maintain the pH of said solution at at least 10.

6. Process for the treatment of filaments having a basis of a polymeric polyurethane formed by reacting 1,4-butanediol with tetramethylene diisocyanate, which comprises heating said filaments in a methyl alcohol solution of formaldehyde containing 10 to 80% by weight of methyl alcohol, 10 to 90% by weight of aqueous 40% formaldehyde and 0.1 to 10% by weight of sodium hydroxide to maintain the pH of said solution at at least 10.

SAMUEL B. McFARLANE.
GILBERT E. MOOS.

REFERENCES CITED

The following references are of record in the file of this patent:

UNITED STATES PATENTS

| Number | Name | Date |
|---|---|---|
| 2,177,637 | Coffman | Oct. 31, 1939 |
| 2,284,637 | Catlin | June 2, 1942 |
| 2,284,896 | Hanford et al. | June 2, 1942 |
| 2,292,443 | Hanford | Aug. 11, 1942 |
| 2,424,883 | Habgood et al. | July 29, 1947 |
| 2,424,885 | Buist et al. | July 29, 1947 |
| 2,430,953 | Schneider | Nov. 18, 1947 |
| 2,441,085 | Schnieder | May 4, 1948 |